(12) United States Patent
Vanhatalo et al.

(10) Patent No.: US 10,351,440 B2
(45) Date of Patent: Jul. 16, 2019

(54) LITHIUM COBALT OXIDE MATERIAL (71) Applicant: Freeport Cobalt Oy, Kokkola (FI)

(72) Inventors: Aki Vanhatalo, Kokkola (FI); Marten Eriksson, Pannainen (FI); Janne Niittykoski, Pietarsaari (FI)

(73) Assignee: Freeport Colbalt Oy, Kokkola (FI)

( * ) Notice: Subject to any disclaimer, the term of this patent is extended or adjusted under 35 U.S.C. 154(b) by 58 days.

(21) Appl. No.: 15/266,578

(22) Filed: Sep. 15, 2016

(65) Prior Publication Data

US 2017/0062807 A1    Mar. 2, 2017

Related U.S. Application Data (63) Continuation-in-part of application No. 13/876,449, filed as application No. PCT/FI2011/050501 on May 31, 2011, now abandoned.

(51) Int. Cl.
| | |
|---|---|
| *H01M 4/1391* | (2010.01) |
| *C01G 51/00* | (2006.01) |
| *H01M 2/02* | (2006.01) |
| *H01M 4/131* | (2010.01) |
| *H01M 4/525* | (2010.01) |
| *H01M 10/0525* | (2010.01) |
| *C01G 51/04* | (2006.01) |
| *H01M 4/02* | (2006.01) |

(52) U.S. Cl.
CPC .......... *C01G 51/42* (2013.01); *C01G 51/04* (2013.01); *H01M 4/525* (2013.01); *C01P 2002/52* (2013.01); *C01P 2002/72* (2013.01); *C01P 2002/76* (2013.01); *C01P 2004/03* (2013.01); *C01P 2004/41* (2013.01); *C01P 2004/51* (2013.01); *C01P 2004/61* (2013.01); *C01P 2006/11* (2013.01); *C01P 2006/12* (2013.01); *C01P 2006/40* (2013.01); *C01P 2006/80* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 5,160,712 A | 11/1992 | Thackeray et al. | |
| 5,955,051 A * | 9/1999 | Li | H01M 4/525 |
| | | | 423/594.4 |
| 2002/0106566 A1 | 8/2002 | Nemoto et al. | |
| 2003/0129496 A1 | 7/2003 | Kasai et al. | |
| 2004/0091781 A1 | 5/2004 | Nakai et al. | |
| 2005/0220701 A1 | 10/2005 | Suhara et al. | |
| 2009/0017384 A1 | 1/2009 | Iwasaki et al. | |
| 2014/0170492 A1 | 6/2014 | Xia et al. | |

FOREIGN PATENT DOCUMENTS

| | | | |
|---|---|---|---|
| CN | 1359353 | | 7/2002 |
| CN | 1368765 | | 9/2002 |
| CN | 1472829 | | 2/2004 |
| CN | 1485278 | * | 3/2004 |
| CN | 101293677 A | | 10/2008 |
| CN | 101345303 | | 1/2009 |
| CN | 101687666 | | 3/2010 |
| EP | 2028704 | | 2/2009 |
| JP | 11-292549 A | | 10/1999 |
| JP | 2002037631 A | * | 2/2002 |
| JP | 2003503300 | | 1/2003 |
| JP | 2005272213 A | * | 10/2005 |
| WO | 01/00532 | | 1/2001 |

OTHER PUBLICATIONS

Chang et al., "Preparation of high density precursor used for cathode of lithium battery," Journals of Functional Materials, May 31, 2009, 40(5):748-751.
Dingsheng Wang et al, "Shape Control of CoO and LiCoO2 Nanocrystals", Nano Research, vol. 3, No. 1, Jan. 1, 2010, pp. 1-7.
International Search Report and Written Opinion for parent application PCT/FI2011/050501, dated Feb. 17, 2012.
Kim et al., "Morphology Controlled Synthesis of Octahedron and Hexagonal Plate of Co3O4", Materials Letters 65, 2011, 650-652.
Lee et al., "Mechanisms for Metal Oxide Particles Synthesized in Supercritical Water," J. Ind. Eng. Chem., 2007, 13(5):835-841.
Notice of Reasons for Rejection for JP2014-513222 dated Jan. 26, 2015.
Notification of First Office Action for CN201180047319.4 dated Sep. 17, 2014.
Search Report for CN201180047319.4 dated Sep. 17, 2014.
Wolveron et al., "Cation and Vacancy Ordering in LixCoO2", Physical Review B, 1998, 57(4).
Xi Wang et al, "Synthesis of Single-Crystalline Co3O4 Octahedral Cages with Tunable Surface Aperture and Their Lithium Storage Properties", Journal of Physical Chemistry C, vol. 113, No. 35, Sep. 3, 2009, pp. 15553-15558.

* cited by examiner

*Primary Examiner* — Tanisha Diggs
(74) *Attorney, Agent, or Firm* — Andrus Intellectual Property Law, LLP (57) ABSTRACT

$LiCoO_2$ material comprises $LiCoO_2$ particles obtainable by a process in which $Co(OH)_2$ particles comprising essentially octahedral shape particles, or $Co_3O_4$ particles obtained from $Co(OH)_2$ comprising essentially octahedral shape particles, or $Co_3O_4$ particles comprising essentially octahedral shape particles and lithium salt are heated. Also disclosed are $Co(OH)_2$ particles and the $Co_3O_4$ particles. The $LiCoO_2$ material can be used especially as a cathode material in Li-ion batteries.

26 Claims, 9 Drawing Sheets

Fig. 1. XRD pattern of Example 1 Co(OH)$_2$ particles.

Fig. 2. SEM figure of Example 1 Co(OH)$_2$ particles.

Fig. 3. SEM figure of Example 2 $Co_3O_4$ particles.

Fig. 4. SEM figure of Example 3 $Co_3O_4$ particles.

Fig. 5. XRD pattern of Example 4 LiCoO$_2$ particles.

Fig. 6. SEM figure of Example 4 LiCoO$_2$ particles.

Fig. 7. SEM figure of Example 5 LiCoO$_2$ particles.

Fig. 8. SEM figure of Example 6 LiCoO$_2$ particles.

Fig. 9. SEM figure of Example 7 LiCoO$_2$ particles.

Fig. 10. SEM figure of Example 8 Zr doped LiCoO$_2$ particles.

Fig. 11. Tde comparison of Example 8 doped LiCoO$_2$ particles.

Fig. 12. XRD pattern of Comparative example 1 Co(OH)$_2$ particles.

Fig. 13. SEM figure of Comparative example 1 $Co(OH)_2$ particles.

Fig. 14. SEM figure of Comparative example 2 $Co_3O_4$ particles.

Fig. 15. SEM figure of Comparative example 3 LiCoO₂ particles.

Fig. 16. SEM figure of Comparative example 4 LiCoO₂ particles.

Fig. 17. SEM figure of Comparative example 5 LiCoO$_2$ particles.

Fig. 18. Tde comparison of Comparative example 6 doped LiCoO$_2$ particles.

LITHIUM COBALT OXIDE MATERIAL

CROSS-REFERENCE TO RELATED PATENT APPLICATIONS

This application is a continuation-in-part of U.S. patent application Ser. No. 13/876,449, which was published on Aug. 8, 2013, as U.S. Publication No. 2014-1024701 and which is the U.S. national stage application of International Application No. PCT/FI2011/050501, filed May 31, 2011, which International application was published on Dec. 6, 2012 as International Publication No. WO 2012/164141 A1 in the English language, and which applications are incorporated herein by reference in their entireties.

DESCRIPTION

Background

Lithium cobalt oxide ($LiCoO_2$) is one of the most important cathode materials in Li-ion batteries (LIB). Because the battery performance of LIBs is strongly derived from the cathode material, the properties of $LiCoO_2$ particles used as a cathode material are very important. For example, the density and the particle size distribution as well as a minimized amount of impurities of the particles are factors affecting for example the size as well as the safety of LIBs. Typical synthesis of $LiCoO_2$ particles comprises sintering a cobalt oxide or hydroxide precursor and a lithium salt at high temperatures (~1000° C.) in air with the presence of the excess lithium salt.

Usually, the particle size of $LiCoO_2$ particles is determined by the sintering process not by the cobalt precursor or the lithium salt. The $LiCoO_2$ particles, which have been produced from a cobalt precursor with a small particle size by using a high Li/Co molar ratio and long sintering time in order to obtain the desired density and particle size of the particles, exhibit an irregular particle shapes due to agglomeration of fine particles into larger ones. After sintering, the formed particles need to be broken down by a milling process. During such process, fines are easily created and it is difficult to control the particle size and the particle size distribution of the formed $LiCoO_2$ particles.

The $LiCoO_2$ cathode material produced by a high Li/Co ratio shows increase in gas generation during the cycling of LIB. While this type of behavior is acceptable when cylindrical shaped battery cells are manufactured, such is not desired when manufacturing laminate cells enclosed in a thin aluminum foil. Therefore, typically finer grades of $LiCoO_2$ are used in such applications to avoid said problems due to the gas generation.

Furthermore, there is additional cost from having to use the higher Li/Co ratio than what is theoretically needed in order to produce the cathode material having a good battery performance. The long sintering time reduces the productivity of the process, which also increases the energy intensive production process for the cathode material. Meanwhile, the high Li/Co molar ratio that further enhances the sintering, raises the need for manual handling and checking of the sintered cake before milling in order to ensure the quality which further increases the cost. LIB technology is described e.g. in Lithium-Ion Batteries: Science and Technologies, Yoshio, M.; Brodd, R.; Kozawa, A. (Eds.), Springer 2009.

Notwithstanding the state of the art described herein, there is a need for further improvements in cobalt precursor materials and in $LiCoO_2$ cathode materials and in the production methods of such materials.

SUMMARY OF THE INVENTION

The invention is related to lithium cobalt oxide ($LiCoO_2$) material and to the preparation and use thereof in Li-ion batteries, to a method for the preparation of lithium cobalt oxide ($LiCoO_2$) material, to cobalt oxide ($Co_3O_4$) particles and a method for their preparation, and to cobalt hydroxide ($Co(OH)_2$) particles and a method for their preparation.

One embodiment of the invention concerns $LiCoO_2$ material which comprises $LiCoO_2$ particles obtainable by a process in which $Co(OH)_2$ particles comprising essentially octahedral shape particles, or $Co_3O_4$ particles obtained from $Co(OH)_2$ comprising essentially octahedral shape particles, or $Co_3O_4$ particles comprising essentially octahedral shape particles, and lithium salt are heated. The material can be used especially as a cathode material in Li-ion batteries.

One embodiment of the invention concerns $Co_3O_4$ particles comprising essentially octahedral shape particles or particles obtainable from $Co(OH)_2$ particles comprising essentially octahedral shape particles. The $Co_3O_4$ particles can be used especially as precursors in the preparation of the $LiCoO_2$ material.

One embodiment of the invention concerns $Co(OH)_2$ particles comprising essentially octahedral shape particles. The $Co(OH)_2$ particles can be used especially as precursors in the preparation of the $Co_3O_4$ particles or in the preparation of the $LiCoO_2$ material.

DESCRIPTION OF THE DRAWINGS

The enclosed drawings form a part of the written description of the invention. They relate to the examples given later and show properties of materials prepared in accordance with the examples.

DETAILED DESCRIPTION OF THE INVENTION

The invention concerns a new type of lithium cobalt oxide (LiCoO$_2$) material. The material comprises LiCoO$_2$ particles obtainable by a process in which Co(OH)$_2$ particles comprising essentially octahedral shape particles, or Co$_3$O$_4$ particles obtainable from Co(OH)$_2$ comprising essentially octahedral shape particles, or Co$_3$O$_4$ particles comprising essentially octahedral shape particles, and lithium salt are heated. Preferably, the LiCoO$_2$ particles comprise essentially octahedral shape particles, and more preferably essentially consist of essentially octahedral shape particles. The material can be used in Li-ion batteries especially as a cathode material.

The invention also concerns cobalt oxide (CO$_3$O$_4$) particles obtainable from cobalt hydroxide (Co(OH)$_2$) particles comprising essentially octahedral shape particles. Preferably, the Co$_3$O$_4$ particles comprise essentially octahedral shape particles, and more preferably, essentially consist of essentially octahedral shape particles. The Co$_3$O$_4$ particles can be used as precursors in the preparation of the LiCoO$_2$ particles.

The invention also concerns Co(OH)$_2$ particles comprising essentially octahedral shape particles. Preferably, the particles essentially consist of essentially octahedral shape particles. The Co(OH)$_2$ particles can be used as precursors in the preparation of the Co$_3$O$_4$ particles or in the preparation of the LiCoO$_2$ particles.

The mentioned Co(OH)$_2$ particles with octahedral morphology can be prepared from a cobalt solution containing chloride, and having a cobalt concentration in the range of 20-300 g/l by reacting simultaneously with an ammonia containing chemical, for example ammonium hydroxide, and an alkaline hydroxide, for example sodium hydroxide, to precipitate the cobalt ions into a Co(OH)$_2$ precipitate. Preferably, the cobalt concentration is in the range of 70-170 g/l. Feed rates of the ammonia containing chemical and the alkaline hydroxide solution are controlled in order to control pH. A ratio of the feed rates between the alkaline hydroxide solution and the ammonia containing chemical with equivalent concentrations is in the range of 1-7. pH is controlled within the range of 10.0-14.0, preferably 10.0-12.5, to minimize the amount of non-precipitated cobalt ions. Temperature is kept essentially constant at selected, relatively low temperature in the range of 30-50° C. during the above reaction when preparing mentioned Co(OH)$_2$ particles with octahedral morphology. For a sufficient mixing, the reaction suspension is mixed by an impeller with a rotation speed monitoring. The precipitated particles are filtered, washed with hot ion exchanged water and dried at 100-150° C. in air.

Co$_3$O$_4$ particles of the invention can be prepared by calcinating Co(OH)$_2$ particles produced by the method described above at 110-1200° C. for 0.5-20 h in air. Preferably, the particles are calcinated at 500-1000° C. for 1-10 h. The formed particles may be screened and/or milled after the calcination process.

LiCoO$_2$ particles of the invention can be prepared by mixing Co(OH)$_2$ particles as a precursor produced by the method described above with Li salt particles, preferably Li$_2$CO$_3$ or LiOH particles, with the Li/Co molar-ratio of 0.90-1.10, preferably 0.95-1.05. No excess of Li need be used, but the ratio can be selected optimally based of desired properties. According to another embodiment, LiCoO$_2$ particles of the invention can be prepared by mixing Co$_3$O$_4$ particles as a precursor produced by the method described above with Li salt particles, preferably Li$_2$CO$_3$ or LiOH particles, with the Li/Co molar-ratio of 0.90-1.10, preferably 0.95-1.05, more preferably 1.00. The obtained mixture is calcinated at 800-1100° C. for 1-10 h in air or in other oxygen containing atmosphere. This calcination process is called as the lithiation process. The formed particles may be screened and/or milled after the lithiation process.

Co(OH)$_2$ particles produced by the method described above were analyzed for various physical and chemical characteristics including the particle size distribution (including average particle size D50), the tap density (Tde), the surface area (SA), the impurity levels (for example alkali metal, such as sodium, and one or more anions from sulphur, chloride, and nitride), and the overall particle morphology. The average particle size D50, as measured by laser diffraction, was determined to be controllable typically in the range of 3-40 µm, especially in the range of 5-20 µm. The tap density was controllable typically in the range of 1.7-2.8 g/cm$^3$, especially in the range of 1.9-2.3 g/cm$^3$. The surface area was determined to be typically in the range of 0.4-5 m$^2$/g, especially in the range of 1.0-2.0 m$^2$/g. The alkali metal, for example sodium, level was controllable typically to less than 400 ppm, typically to less than 200 ppm, and each of the anions sulphur, chloride, and nitride typically to less than 0.15%, especially to less than 0.07%. Other impurities may be controlled based on the feed solutions used during the precipitation method. The Co(OH)$_2$ particles were determined from scanning electron microscope (SEM) figures to comprise essentially octahedral shape particles. The crystal structure and chemical composition of Co(OH)$_2$ particles were determined by X-ray powder diffraction (XRD) and the potentiometric titration method. Typical XRD shows a pure β-Co(OH)$_2$ phase with the P$\overline{3}$m1 space group. Potentiometric titration gives Co-% values typically close to the theoretical value of 63.4%.

Co$_3$O$_4$ particles produced by the methods described above were analyzed for various physical characteristics including the particle size distribution (including average particle size D50), the tap density, the surface area, the impurity levels (for example alkali metal, such as sodium, and one or more anions from sulphur, chloride, and nitride) and the overall particle morphology. The average particle size D50, as measured by laser diffraction, was determined to be controllable typically in the range of 3-30 µm, especially in the range of 5-20 µm. The tap density was controllable typically in the range of 1.8-3.0 g/cm$^3$, especially in the range of 2.1-2.6 g/cm$^3$. The surface area was determined to be typically in the range of 0.2-20 m$^2$/g, especially in the range of 0.3-2.0 m$^2$/g. The alkali metal, such as sodium, level was controllable typically to less than 400 ppm, especially to less than 200 ppm, and each anion from sulphur, chloride, and nitride typically to less than 0.10%, especially to less than 0.03%. Other impurities may be controlled based on the feed solutions used during the precipitation method of Co(OH)$_2$. A risk of a contamination during a possible milling step is low since the need for a milling is reduced due to a typically formed soft cake in the calcination. In one embodiment, the Co$_3$O$_4$ particles were determined from the SEM figures to comprise essentially octahedral shape particles. In another embodiment, the Co$_3$O$_4$ particles were determined from the SEM figures to comprise irregular shape particles without essentially octahedral shape particles. The crystal structure and chemical composition of $Co_3O_4$ particles were determined by X-ray powder diffraction (XRD) and potentiometric titration method. Typical XRD shows a pure $Co_3O_4$ phase with the spinel crystal structure with the Fd3m space group. Potentiometric titration gives Co-% values typically close to the theoretical value of 73.4%.

$LiCoO_2$ particles produced by the methods described above were analyzed for various physical characteristics including the particle size distribution (including average particle size D50), the tap density, the surface area, the impurity levels (for example alkali metal, such as sodium, and one or more anions from sulphur, chloride, and nitride) and the overall particle morphology. The average particle size D50, as measured by laser diffraction, was determined to be controllable typically in the range of 3-30 μm, especially in the range of 5-20 μm. The tap density was controllable typically in the range of 1.9-3.3 g/cm$^3$, especially in the range of 2.7-3.1 g/cm$^3$. The surface area was determined to be typically in the range of 0.1-0.6 m$^2$/g, especially in the range of 0.2-0.5 m$^2$/g. The alkali metal, such as sodium, level was controllable typically to less than 400 ppm, especially to less than 200 ppm, and each anion from sulphur, chloride, and nitride typically to less than 0.10%, especially to less than 0.02%. Other impurities may be controlled based on the feed solutions used during the precipitation method of $Co(OH)_2$. A risk of a contamination during a possible milling step is low since the need for a milling is reduced due to a typically formed soft cake in the calcination. In one embodiment, the $LiCoO_2$ particles were determined from the SEM figures to comprise essentially octahedral shape particles In another embodiment, the $LiCoO_2$ particles were determined from the SEM figures to comprise irregular shape particles without essentially octahedral shape particles. The crystal structure and chemical composition of $LiCoO_2$ particles were determined by X-ray powder diffraction (XRD) and potentiometric titration method and atomic absorption spectroscopy (AAS). Typical XRD shows a pure $LiCoO_2$ phase with the layered crystal structure with the R$\bar{3}$m space group. Potentiometric titration gives Co-% values typically close to the theoretical value of 60.2%. AAS gives the Li-% values typically close to the theoretical value of 7.1%.

pH and free $Li_2CO_3$ of $LiCoO_2$ particles were determined. pH was determined from a suspension containing 1 g of $LiCoO_2$ sample in 100 ml of deionized water. Free $Li_2CO_3$ was determined by mixing 20 g of $LiCoO_2$ sample in 100 ml of deionized water followed by filtration. The filtered water solution was then titrated by a HCl solution in two steps. In the first, HCl was added until a phenolphthalein indicator changed colour at neutral conditions. In the second step, methyl orange was used as an indicator. The free $Li_2CO_3$-% can be obtained with the aid of the second step when methyl orange change colour at acidic conditions. pH gives indication about the free hydroxide phases, for example LiOH, in $LiCoO_2$ particles. Both pH and free $Li_2CO_3$ give indication of the level of gaseous components in the cell comprising of the $LiCoO_2$ cathode material. LiOH and $Li_2CO_3$ can be decomposed electrochemically at cell voltages, generating for example oxygen and carbon dioxide gases. These predominantly gaseous products can lead to pressure buildup in the cell and further generate a safety issue. By minimization of the formation of LiOH and $Li_2CO_3$ in the preparation method of $LiCoO_2$ particles, the pressure buildup and the safety issue can be eliminated from the cell. Typically, pH was less than 10.1, especially less than 9.7, and free $Li_2CO_3$ was less than 0.1%, especially less than 0.03%.

Electrochemical properties of the $LiCoO_2$ particles were determined with coin cell tests. The coin cell testing conditions were as follow: Coin cell: CR2016; Anode: Lithium; Cathode: Active material 95%, acetylene black 2%, PVdF 3%; Coating thickness 100 μm on 20 μm; Al foil, pressing by 6 t/cm$^2$ pressure; Cathode size 1 cm$^2$; Electrolyte: 1 M $LiPF_6$ (EC/DMC=1/2); Separator: Glass filter; Charging: 0.2 mA/cm$^2$ (about 0.15 C) up to 4.30 V (vs. Li/Li$^+$); 1$^{st}$ discharge: 0.2 mA/cm$^2$ to 3.00 V (vs. Li/Li$^+$); 2$^{nd}$ discharge: 2.0 mA/cm$^2$ to 3.00 V (vs. Li/Li$^+$); 3$^{rd}$ discharge: 4.0 mA/cm$^2$ to 3.00 V (vs. Li/Li$^+$); 4$^{th}$ discharge: 8.0 mA/cm$^2$ to 3.00 V (vs. Li/Li$^+$); 5$^{th}$ discharge—60$^{th}$ discharge 4.0 mA/cm$^2$ to 3.00 V (vs. Li/Li$^+$). Rate capability is determined as 8.0 mA/cm$^2$/0.2 mA/cm$^2$. Typically, the initial charge capacity was more than 154 mAh/g, especially more than 155 mAh/g, the rate capability was more than 85%, especially more than 95%, and the cyclability (5-30) was more than 70%, especially more than 90%.

Octahedral shape means a shape of a polyhedron with eight faces and six vertexes. All the faces have shape of a triangle. Height, length and depth of the octahedron are determined with the distance between three pair of opposite vertexes. In a regular octahedron, the ratio of height:length:depth is 1:1:1. In this case, such distortion is allowed that any of the previous ratios can be in the range of 0.3-3. Such distortion is also allowed that faces can contain voids and nodules and triangle edges are not necessarily straight lines but can contain curves. In accordance with the invention, preferably more than 20%, more preferably more than 50% of the $Co(OH)_2$ particles have essentially octahedral shape. Most preferably essentially all particles have essentially octahedral shape.

In accordance with the invention, $LiCoO_2$ particles with a high density and a good electrochemical quality could be obtained when a low Li/Co ratio was used in the lithiation. Typically, when a low Li/Co ratio has been used in the lithiation, the density of the formed particles has become low, which is not desirable for a good quality cathode material. Further in accordance with the invention, $LiCoO_2$ particles with a high density and a good electrochemical quality as well as a low risk of a pressure buildup in a cell were obtained when a low Li/Co ratio was used in the lithiation. Typically, the density of the formed particles in the lithiation has been increased with the aid of using a high Li/Co-ratio. Usually this has lead to deterioration of the electrochemical quality and to an increased risk of pressure buildup in a cell. In addition, a high Li/Co ratio can lead to difficulties to control a particle size distribution and morphology of the formed particles in the lithiation as well as an increased contamination risk during milling due to a typically formed hard cake in the lithiation. In accordance with the invention, the morphology of the formed $LiCoO_2$ particles in the lithiation could be remained essentially the same compared to that of the cobalt precursor particles. Preferably more than 20%, more preferably more than 50%, most preferably essentially all of the $LiCoO_2$ particles have the same morphology than those of cobalt precursor particles.

In accordance with the invention, $Co(OH)_2$ particles could be formed whose morphology remained essentially the same after the lithiation. Further, in accordance with the invention, $Co(OH)_2$ particles could be formed that can be used as a precursor to obtain $LiCoO_2$ particles with a high density and good electrochemical quality. Further, in accordance with the invention, $Co(OH)_2$ particles could be formed that can be used as a precursor to obtain $LiCoO_2$ particles with a high density and good electrochemical quality, and with a low risk of a pressure buildup in a cell.

In accordance with the invention, $Co_3O_4$ particles could be formed whose morphology remained essentially the same after the lithiation. Further, in accordance with the invention, $Co_3O_4$ particles could be formed that can be used as a precursor to obtain $LiCoO_2$ particles with a high density and good electrochemical quality. Further, in accordance with the invention, $Co_3O_4$ particles could be formed that can be used as a precursor to obtain $LiCoO_2$ particles with a high density and good electrochemical quality, and with a low risk of a pressure buildup in a cell.

One or more dopants from the group of Mg, Ca, Sr, Ti, Zr, B, Al, and F can be added in the $LiCoO_2$ particles. The dopants can be added in one or more steps including the precipitation step, the calcination step, the lithiation step and a separate step after or prior the lithiation. These steps comprise following:

Precipitation step: dopants are precipitated with $Co(OH)_2$ into or on the particles to form doped $Co(OH)_2$.

Calcination step: dopants mixed with $Co(OH)_2$ and calcinated to form doped $Co_3O_4$.

Lithiation step: dopants mixed with Li-source and/or Co-source and calcinated all together to form doped $LiCoO_2$. Separate step: dopants added prior or after lithiation.

Prior lithiation step: dopants are mixed with Co-source including some heat treatment.

After lithiation step: dopants are mixed with $LiCoO_2$ including some heat treatment.

Adding dopants into $LiCoO_2$ have been illustrated these steps are illustrated In the example 8 and reference example dopants have been added in lithiation step.

The concentration of the dopants is preferably in the range of 0.05-5 mol-% from Co. In general, dopants are important for the performance of a cathode material in LIB. Dopants are added for example to improve thermal and high voltage stability as well as to minimize the capacity fade of the cathode material. Usually, physical properties, for example tap density, of the cathode materials are deteriorated when dopants are added. In one embodiment of the invention, the tap density of the doped $LiCoO_2$ particles was decreased by maximum of 5% compared to that of the non-doped particles.

EXAMPLES

The following examples illustrate the preparation and the properties of the $Co(OH)_2$ particles, $Co_3O_4$ particles and $LiCoO_2$ particles in accordance with the invention, but these examples are not considered to be limiting the scope of this invention.

Example 1

Preparation of $Co(OH)_2$ Particles Comprising Essentially Octahedral Shape Particles $Co(OH)_2$ particles were precipitated in a 150 liter reactor by pumping cobalt chloride solution (80 g/l), ammonium hydroxide solution (220 g/l) and sodium hydroxide solution (220 g/l) into it. Feed rates of sodium hydroxide and ammonium hydroxide solutions were controlled in order to keep pH in the level of 10.0-12.5 to precipitate all cobalt ions from the solution. A ratio of the feed rates between sodium hydroxide and ammonium hydroxide was in the range of 2-4. Temperature was kept constant at 40° C. Mixing in the reactor was controlled (80 rpm). The precipitated particles were collected sequentially as an overflow. The precipitated particles were filtered, washed with hot ion exchanged water and dried at 110° C. in air.

Figure 1:
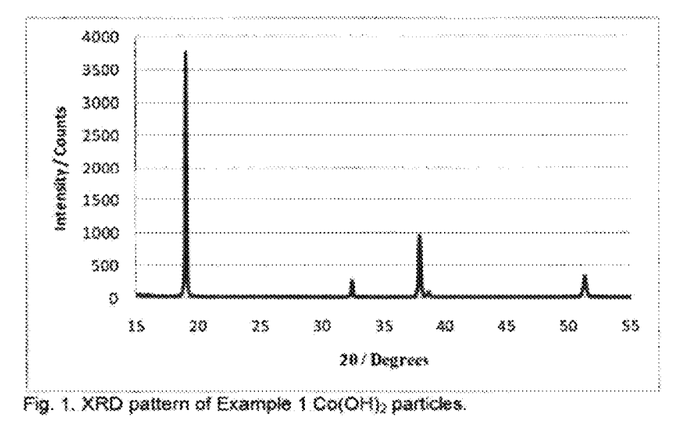
FIG. 1 provides an XRD pattern of Example 1 $Co(OH)_2$ particles.
Figure 2:
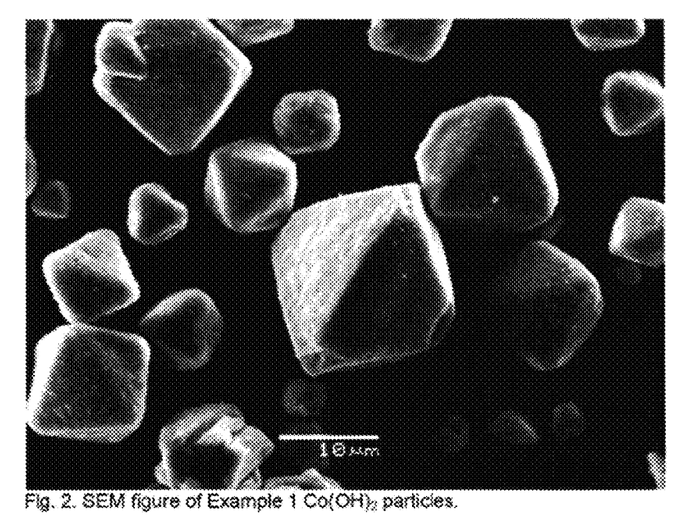
FIG. 2 provides an SEM figure of Example 1 $Co(OH)_2$ particles.

Well crystallized β-$Co(OH)_2$ phase with the $P\overline{3}m1$ space group was observed by X-ray powder diffraction (XRD) (FIG. 1). Impurity phases were not observed. Co-% of 62.9%, determined by a potentiometric titration method, gave further proof about the formation of the pure $Co(OH)_2$ without impurities. The SEM figure shows that the formed $Co(OH)_2$ particles were dense with smooth surface structure and the particles were comprising essentially octahedral shape particles (FIG. 2). The average particle size of the formed $Co(OH)_2$ particles D50 was 15.7 µm with D10 and D90 values of 5.7 µm and 31.7 µm, respectively. Tap density (Tde) of the formed $Co(OH)_2$ particles was high 2.29 g/cm$^3$ and surface area (SA) low 1.5 m$^2$/g. The particles formed in this example are used as a precursor in the latter examples.

Example 2

Preparation of $Co_3O_4$ Particles Comprising Essentially Octahedral Shape Particles $Co_3O_4$ particles were prepared by the method presented in the Example 1, but further calcinating the formed $Co(OH)_2$ particles comprising essentially octahedral shape particles at 700° C. for 2 h in air. This example shows that morphology and physical properties of the $Co(OH)_2$ particles comprising essentially octahedral shape particles can strongly affect on the morphology and physical properties of the $Co_3O_4$ particles formed by the calcination process.

Figure 3:
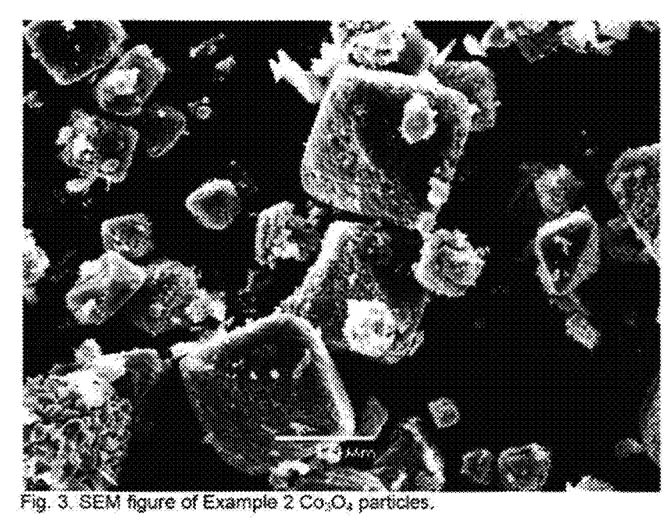
FIG. 3 provides an SEM figure of Example 2 $Co_3O_4$ particles.

$Co_3O_4$ particles with the spinel crystal structure (Fd3m space group) were formed by the calcination process. Co-% of 74.2% gave further proof about the transformation of the $Co(OH)_2$ phase to the $Co_3O_4$ phase. Insignificant sintration of the particles occurred during the calcination, since the morphology and the physical properties of the particles remained essentially the same after the calcination. This can be observed from the following data. The SEM figure shows that the $Co_3O_4$ particles were comprising essentially octahedral shape particles (FIG. 3). The D50, D10 and D90 values were 15.5 µm, 5.4 µm and 31.1 µm, respectively. Tde was 2.26 g/cm$^3$ and SA 1.6 m$^2$/g. The above values are essentially the same as those of the Example 1 values (Table 1). The particles formed in this example are used as a precursor in the latter examples.

Example 3

Preparation of $Co_3O_4$ Particles with Modified Morphology from $Co(OH)_2$ Particles Comprising Essentially Octahedral Shape Particles $Co_3O_4$ particles were prepared by the method presented in the Example 1, but further calcinating formed $Co(OH)_2$ particles comprising essentially octahedral shape particles at 900° C. for 2 h in air. This example shows that morphology and physical properties of $Co_3O_4$ particles formed by the calcination process can be modified by the process conditions.

Figure 4:
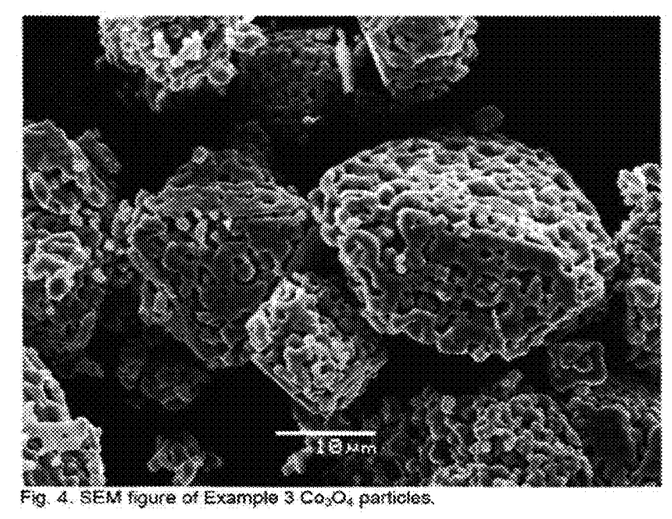
FIG. 4 provides an SEM figure of Example 3 $Co_3O_4$ particles.

$Co_3O_4$ particles with the spinel crystal structure (Fd3m space group) were formed by the calcination process. Co-% of 74.2% gave further proof about the transformation of the $Co(OH)_2$ phase to the $Co_3O_4$ phase. Sintration of the particles occurred during the calcination, since the particles morphology and physical properties were changed by the calcination process. This can be observed from the following data. The SEM figure shows that the $Co_3O_4$ particles were comprising irregular shape particles without essentially octahedral shape particles (FIG. 4). The D50, D10 and D90 values were 14.4 µm, 6.4 µm and 26.0 µm, respectively. Tde was 2.56 g/cm$^3$ and SA 0.55 m$^2$/g. The particle size distribution is narrower, Tde higher and SA lower compared to those of the Example 1 and Example 2 values (Table 1). The particles formed in this example are used as a precursor in the latter examples.

Example 4

Preparation of LiCoO$_2$ Particles Comprising Essentially Octahedral Shape Particles from Example 1 Co(OH)$_2$ Particles Co(OH)$_2$ particles, prepared by the method presented in the Example 1, were intimately mixed with Li$_2$CO$_3$ particles with the Li/Co molar-ratio of 1.00. The obtained mixture was further calcinated at 1000° C. for 5 h in air. This calcination process is called as a lithiation process. This example shows that morphology and physical properties of the Co(OH)$_2$ particles comprising essentially octahedral shape particles can strongly affect on the morphology and physical properties of the LiCoO$_2$ particles formed by the lithiation process.

Figure 5:
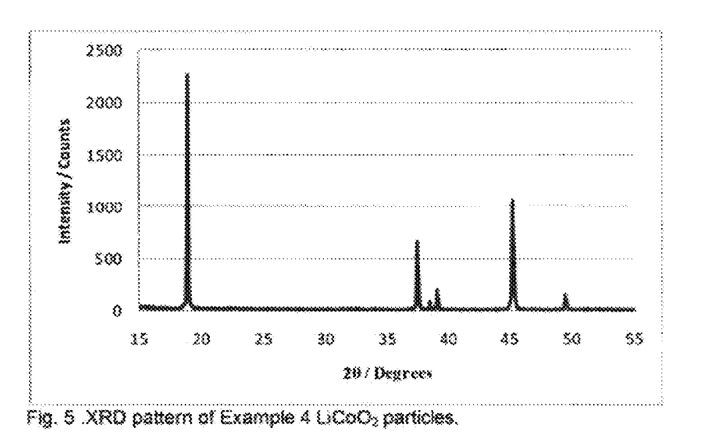
FIG. 5 provides an XRD pattern of Example 4 $LiCoO_2$ particles.
Figure 6:
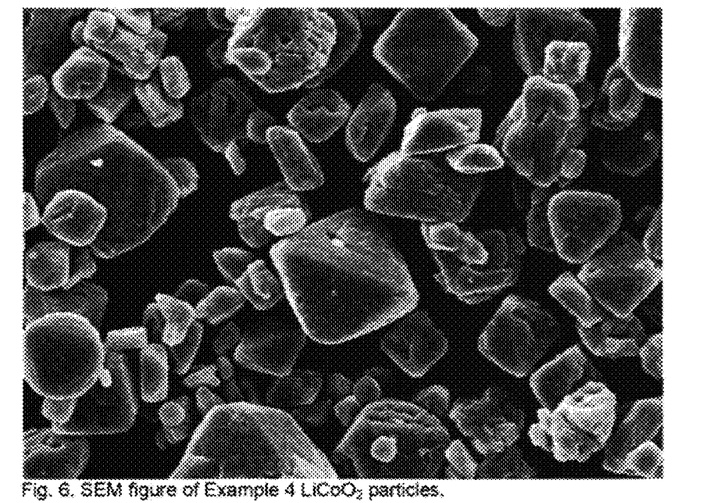
FIG. 6 provides an SEM figure of Example 4 $LiCoO_2$ particles.

LiCoO$_2$ particles with the layered crystal structure (R$\bar{3}$m space group) were formed by the lithiation process (FIG. 5). No traces of Co(OH)$_2$ or Co$_3$O$_4$ were observed. Co-% and Li-% (Li determined by atomic absorption spectroscopy) were 59.7% and 7.0%, respectively, that further proves the formation of the LiCoO$_2$ particles. The morphology of the particles remained essentially the same after the lithiation. The physical properties of the particles were slightly modified by the lithiation process. These can be observed from the following data. The SEM figure shows that the formed LiCoO$_2$ particles were comprising essentially octahedral shape particles (FIG. 6). The D50, D10 and D90 values were 13.8 µm, 5.9 µm and 25.9 µm, respectively. Tde was 2.88 g/cm$^3$ and SA 0.41 m$^2$/g. The above results show the narrowed particle size distribution and densification of the particles due to the lithiation when compared to those of Example 1 values (Table 1).

pH and free Li$_2$CO$_3$ were determined as described in the description of the invention. Both of pH and free Li$_2$CO$_3$ give indication about the amount of gaseous components in the cell. pH and free Li$_2$CO$_3$ of formed LiCoO$_2$ particles were 9.66 and 0.017%. Both of the values are low indicating a low risk of pressure buildup in the cell comprised of the LiCoO$_2$ particles containing essentially octahedral shape particles.

The coin cell testing was performed as described in the description of the invention. The coin-cell test showed the high initial charge capacity (155.0 mAh/g), good rate capability (96.5%) and good cyclability (90.1%, 5-30; 74.6%, 5-60). These results indicate that LiCoO$_2$ particles comprising essentially octahedral shape particles have a good electrochemical quality as a cathode material for LIB.

Example 5

Preparation of LiCoO$_2$ Particles with Modified Morphology from Example 1 Co(OH)$_2$ Particles Co(OH)$_2$ particles, prepared by the method presented in the Example 1, were intimately mixed with Li$_2$CO$_3$ particles with the Li/Co molar-ratio of 1.04. The obtained mixture was further calcinated at 1050° C. for 5 h in air. This example shows that morphology and physical properties of LiCoO$_2$ particles formed by the lithiation process can be modified by the process conditions, but the formed particles have still good performance as a cathode material.

Figure 7:
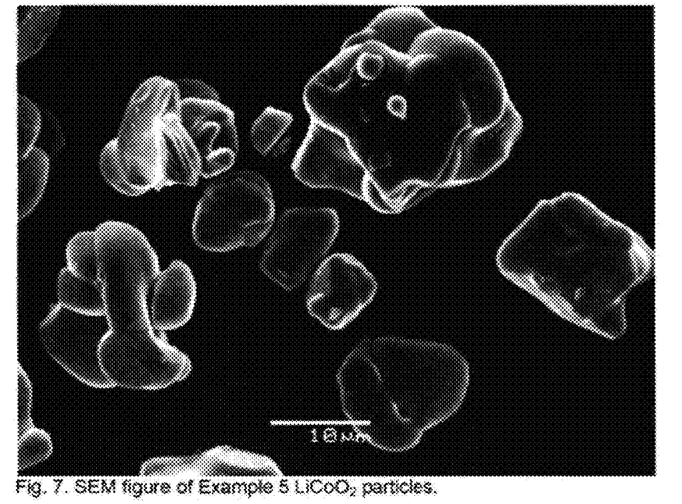
FIG. 7 provides an SEM figure of Example 5 $LiCoO_2$ particles.

LiCoO$_2$ particles with the layered crystal structure (R$\bar{3}$m space group) were formed by the lithiation process. No traces of Co(OH)$_2$ or Co$_3$O$_4$ were observed. Co-% and Li-% were 59.3% and 7.3%, respectively, that further proves the formation of the LiCoO$_2$ particles. The morphology and physical properties of the particles were modified by the lithiation process. This can be observed from the following data. The SEM figure shows that the LiCoO$_2$ particles were comprising irregular shape particles without essentially octahedral shape particles (FIG. 7). The D50, D10 and D90 values were 14.7 µm, 8.4 µm and 26.6 µm, respectively. Tde was 2.78 g/cm$^3$ and SA 0.16 m$^2$/g. The above results show the narrowed particle size distribution and densification of the particles when compared to those of the Example 1 hydroxide values, but increased particle size with less dense particles when compared to those of the Example 4 LiCoO$_2$ values (Table 1).

pH and free Li$_2$CO$_3$ were 9.63 and 0.024%, respectively. Both of the values are low indicating a low risk of pressure buildup in the cell. The coin cell testing was performed as described in the description of the invention. The coin-cell test showed the high initial charge capacity (157.8 mAh/g) and moderate rate capability (89.5%). These results indicate that LiCoO$_2$ particles prepared from Co(OH)$_2$ particles comprising essentially octahedral shape particles have a good electrochemical quality as a cathode material for LIB.

Example 6

Preparation of LiCoO$_2$ Particles with Modified Morphology from Example 2 Co$_3$O$_4$ Particles Co$_3$O$_4$ particles, prepared by the method presented in the Example 2, were intimately mixed with Li$_2$CO$_3$ particles with the Li/Co molar-ratio of 1.00. The obtained mixture was further calcinated at 1000° C. for 5 h in air. This example shows that morphology and physical properties of LiCoO$_2$ particles formed by the lithiation process can be modified by the process conditions, but the formed particles have still good performance as a cathode material.

Figure 8:
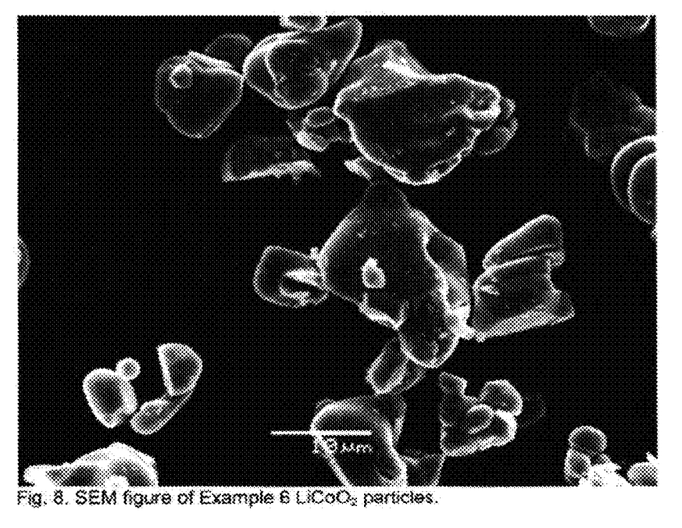
FIG. 8 provides an SEM figure of Example 6 $LiCoO_2$ particles.

LiCoO$_2$ particles with the layered crystal structure (R$\bar{3}$m space group) were formed by the lithiation process. No traces of Co$_3$O$_4$ were observed. Co-% and Li-% were 59.7% and 7.0%, respectively, that further proves the formation of the LiCoO$_2$ particles. The morphology and physical properties of the particles were modified by the lithiation process. This can be observed from the following data. The SEM figure shows that the LiCoO$_2$ particles were comprising irregular shape particles without essentially octahedral shape particles (FIG. 8). The D50, D10 and D90 values were 18.5 µm, 7.5 µm and 38.1 µm, respectively. Tde was 3.01 g/cm$^3$ and SA 0.21 m$^2$/g. The above results show the increased particle size and densification of the particles when compared to those of the Example 2 oxide values as well as to those of the Example 4 LiCoO$_2$ values (Table 1).

pH and free Li$_2$CO$_3$ were 9.83 and 0.046%, respectively. The values are higher than those of the Example 4 values, but still low indicating a low risk of pressure buildup in the cell. The coin cell testing was performed as described in the description of the invention. The coin-cell test showed the high initial charge capacity (156.8 mAh/g) and moderate rate capability (88.2%). These results indicate that LiCoO$_2$ particles prepared from Co$_3$O$_4$ particles comprising essentially octahedral shape particles have a good electrochemical quality as a cathode material for LIB.

Example 7

Preparation of LiCoO$_2$ Particles with Modified Morphology from Example 3 Co$_3$O$_4$ Particles Co$_3$O$_4$ particles, prepared by the method presented in the Example 3, were intimately mixed with Li$_2$CO$_3$ particles with the Li/Co molar-ratio of 0.98. The obtained mixture was further calcinated at 1000° C. for 5 h in air. This example shows that morphology and physical properties of LiCoO$_2$ particles formed by the lithiation process can be modified by the process conditions, but have still good performance as a cathode material.

Figure 9:
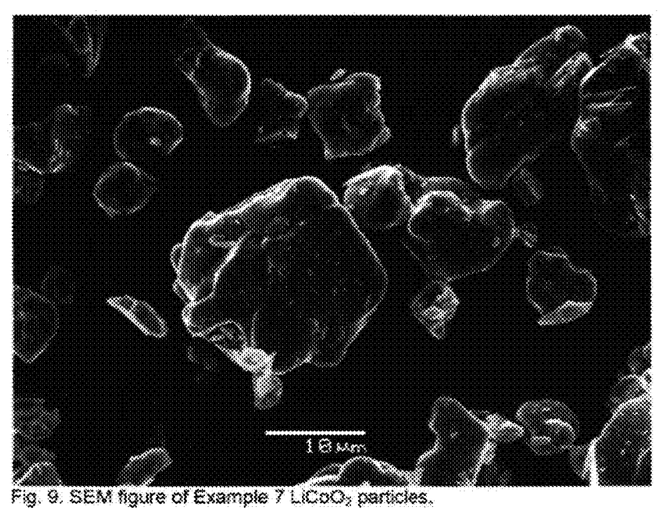
FIG. 9 provides an SEM figure of Example 7 $LiCoO_2$ particles.

LiCoO$_2$ particles with the layered crystal structure (R$\bar{3}$m space group) were formed by the lithiation process. No traces of Co$_3$O$_4$ were observed. Co-% and Li-% were 60.0% and 6.9%, respectively, that further proves the formation of the LiCoO$_2$ particles. The morphology and physical properties of the particles were modified by the lithiation process. This can be observed from the following data. The SEM figure shows that the LiCoO$_2$ particles were comprising irregular shape particles without essentially octahedral shape particles (FIG. 9). The D50, D10 and D90 values were 17.7 µm, 7.7 µm and 32.7 µm, respectively. Tde was 2.94 g/cm$^3$ and SA 0.27 m$^2$/g. The above results show the increased particle size and densification of the particles when compared to those of the Example 3 oxide values as well as those of the Example 4 LiCoO$_2$ values (Table 1).

pH and free Li$_2$CO$_3$ were 9.90 and 0.061%, respectively. The values are higher than those of the Example 4 values, but still low indicating a low risk of pressure buildup in the cell. The coin cell testing was performed described in the description of the invention. The coin-cell test showed the high initial charge capacity (154.9 mAh/g) and moderate rate capability (87.4%). These results indicate that LiCoO$_2$ particles whose preparation method includes Co(OH)$_2$ particles comprising essentially octahedral shape particles have a good electrochemical quality as a cathode material for LIB.

Example 8

Preparation of Doped LiCoO$_2$ Particles Comprising Essentially Octahedral Shape Particles from Example 1 Co(OH)$_2$ Doped LiCoO$_2$ particles were prepared by the method presented in the Example 4, but 0.2 mol-% of dopants (Mg, Al, Ti, Zr, B, Al+Ti, Mg+Al, Al+Zr, F, Ca, Sr) were intimately mixed with Co(OH)$_2$ particles prior the mixing with Li$_2$CO$_3$. The dopants were added as oxides except F as LiF and Ca as well as Sr as hydroxides. This example shows that morphology and physical properties of the LiCoO$_2$ particles comprising essentially octahedral shape particles remain essentially the same even if the dopants are added.

Figure 10:
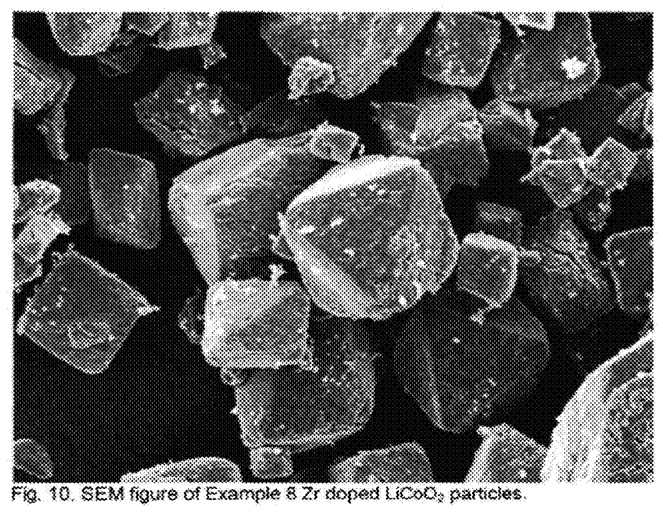
FIG. 10 provides an SEM figure of Example 8 Zr doped $LiCoO_2$ particles.
Figure 11:
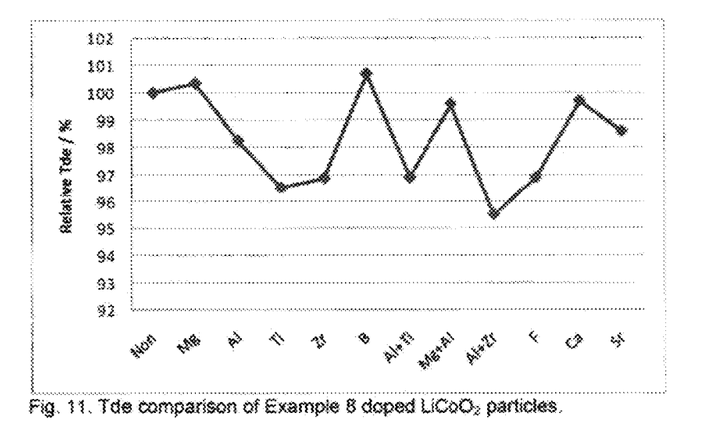
FIG. 11 provides a Tde comparison of Example 8 doped LiCoO2 particles.

Doped LiCoO$_2$ particles with the layered crystal structure (R$\bar{3}$m space group) were formed by the lithiation process. No traces of Co(OH)$_2$ or Co$_3$O$_4$ were observed. The SEM figure shows that the LiCoO$_2$ particles were comprising essentially octahedral shape particles (FIG. 10). Density of the doped LiCoO$_2$ particles was only slightly lower than that of the Example 4 non-doped LiCoO$_2$ particles. Tde of the doped particles was decreased by maximum of 5% compared to that of the non-doped particles (FIG. 11). These results indicate that one or more dopants can be easily added to LiCoO$_2$ particles comprising essentially octahedral shape particles.

The following comparative examples show the preparation and properties of typical prior art products.

Comparative Example 1

Preparation of Comparative Co(OH)$_2$ Particles without Octahedral Shape Particles Co(OH)$_2$ particles were precipitated in 150 liter reactor by pumping cobalt sulphate solution (80 g/l), ammonium hydroxide solution (220 g/l) and sodium hydroxide solution (220 g/l) into it. Feed rates of sodium hydroxide and ammonium hydroxide solutions were controlled in order to keep pH in the level of 10.0-12.5 to precipitate all cobalt ions from the solution. A ratio of the feed rates between sodium hydroxide and ammonium hydroxide was in the range of 3-5. Temperature was kept constant at 65° C. Mixing in the reactor was controlled (240 rpm). The precipitated particles were collected sequentially as an overflow. The precipitated particles were filtered, washed with hot ion exchanged water and dried at 110° C. in air. This comparative example shows Co(OH)$_2$ particles that can be considered as typical particles in the field.

Figure 12:
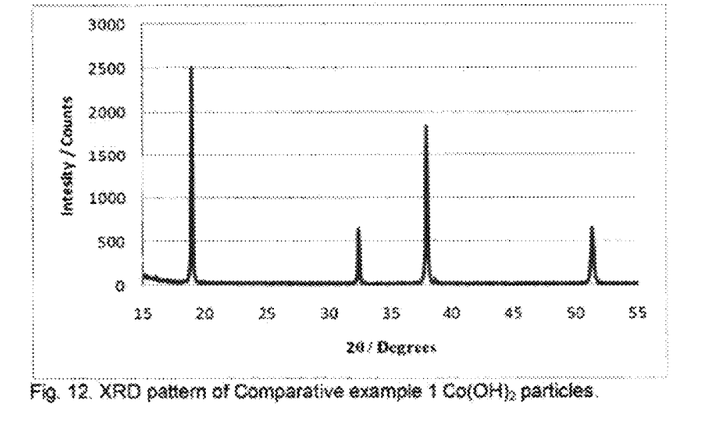
FIG. 12 provides an XRD pattern of Comparative example 1 $Co(OH)_2$ particles.
Figure 13:
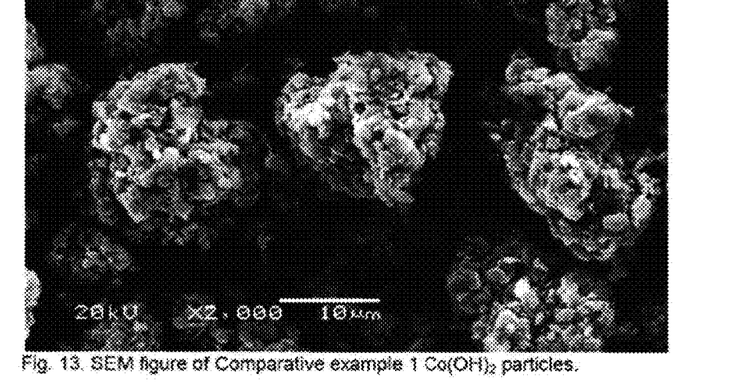
FIG. 13 provides an SEM figure of Comparative example 1 $Co(OH)_2$ particles.

Well crystallized β-Co(OH)$_2$ phase with the P$\bar{3}$m1 space group was observed by X-ray powder diffraction (XRD) (FIG. 12). Impurity phases were not observed. Co-% was 62.7% giving further proof about the formation of the pure Co(OH)$_2$ without impurities. Morphology and the physical properties of the formed Co(OH)$_2$ particles were clearly different compared to those of the Example 1 ones. The SEM figure shows that the formed Co(OH)$_2$ particles were not dense, had voids in the surface, and the particles were comprising irregular particles without octahedral shape particles (FIG. 13). The D50, D10 and D90 values were 11.0 µm, 1.1 µm and 20.5 µm, respectively. Tde was 1.53 g/cm$^3$ and SA 2.4 m$^2$/g. The particle size of the formed particles is smaller, Tde is lower and SA is higher compared to those of the Example 1 values (Table 1). These results indicate that the properties of the Co(OH)$_2$ particles are superior when the essentially octahedral shape particles are formed as described in the Example 1. Benefits are further shown in the examples, where LiCoO$_2$ particles are prepared from the Co(OH)$_2$ particles.

Comparative Example 2

Preparation of Comparative Co$_3$O$_4$ Particles without Octahedral Shape Particles Co$_3$O$_4$ particles were prepared by the method presented in the Comparative example 1, but further calcinating formed Co(OH)$_2$ particles at 900° C. for 2 h in air. This comparative example shows Co$_3$O$_4$ particles that can be considered as typical particles in the field.

Figure 14:
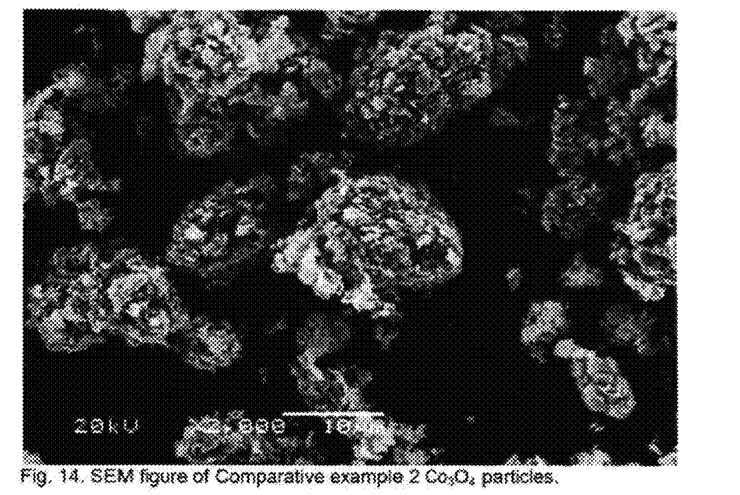
FIG. 14 provides an SEM figure of Comparative example 2 $Co_3O_4$ particles.

Co$_3$O$_4$ particles with the spinel crystal structure (Fd3m space group) were formed. Co-% of 73.2% gave further proof about the transformation of the Co(OH)$_2$ phase to the Co$_3$O$_4$ phase. Insignificant sintration of the particles occurred during the calcination, since the morphology and the physical properties of the particles remained essentially the same after the calcination. This can be observed from the following data. The SEM figure shows that the formed Co$_3$O$_4$ particles were not dense, had voids in the surface, and the particles were comprising irregular particles without octahedral shape particles (FIG. 14). The D50, D10 and D90 values were 11.9 µm, 2.3 µm and 20.7 µm, respectively. Tde was 1.64 g/cm$^3$ and SA 2.2 m$^2$/g. The above values are essentially the same as those of the Comparative example 1 values, but the formed particles are smaller, Tde is lower and SA is higher compared to those of the Example 2 and Example 3 values (Table 1). These results indicate that the properties of the Co$_3$O$_4$ particles are superior when the essentially octahedral shape particles are formed as described in the Examples 2 and 3. Benefits are further shown in the examples, where LiCoO$_2$ particles are prepared from the Co$_3$O$_4$ particles.

Comparative Example 3

Preparation of Comparative LiCoO$_2$ Particles without Octahedral Shape Particles from Comparative Example 1 Co(OH)$_2$ Particles Co(OH)$_2$ particles, prepared by the method presented in the Comparative example 1, were intimately mixed with Li$_2$CO$_3$ particles with the Li/Co molar-ratio of 1.00. The obtained mixture was further calcinated at 1000° C. for 5 h in air. This comparative example shows LiCoO$_2$ particles prepared using the same Li/Co ratio and same temperature as in the Example 4, but from Co(OH)$_2$ particles without octahedral shape particles.

Figure 15:
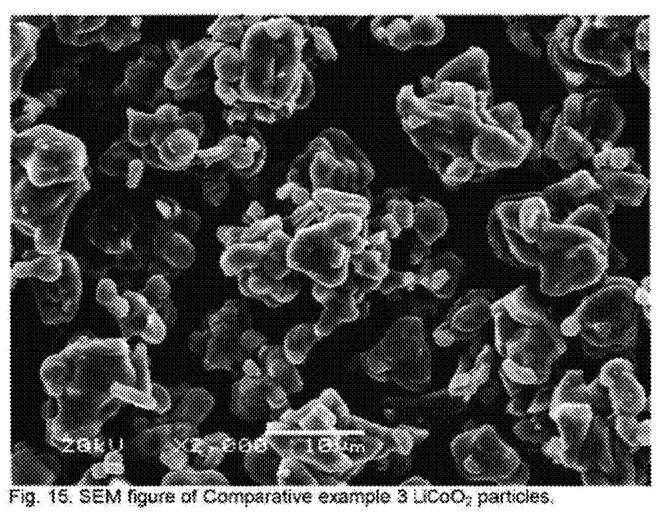
FIG. 15 provides an SEM figure of Comparative example 3 $LiCOO_2$ particles.

LiCoO$_2$ particles with the layered crystal structure (R$\bar{3}$m space group) were formed by the lithiation process. No traces of Co(OH)$_2$ or Co$_3$O$_4$ were observed. Co-% and Li-% were 59.7% and 7.1%, respectively, that further proves the formation of the LiCoO$_2$ particles. The morphology and physical properties of the particles were modified by the lithiation process. These can be observed from the following data. The SEM figure shows that the LiCoO$_2$ particles were comprising irregular shape particles without essentially octahedral shape particles (FIG. 15). The D50, D10 and D90 values were 12.3 µm, 3.6 µm and 21.5 µm, respectively. Tde was 2.53 g/cm$^3$ and SA 0.57 m$^2$/g. The above results show the increased particle size and densification of the particles when compared to those of the Comparative Example 1 Co(OH)$_2$ values, but particles are clearly less dense when compared to those of the Examples 4-7 LiCoO$_2$ values (Table 1). The latter is clear indication of the benefit of LiCoO$_2$ particles comprising essentially octahedral shape particles as well as LiCoO$_2$ particles whose preparation method includes Co(OH)$_2$ particles comprising essentially octahedral shape particles.

pH and free Li$_2$CO$_3$ were 9.77 and 0.028%, respectively. The values are higher than those of the Example 4 values, but still low indicating a low risk of pressure buildup in the cell. The coin-cell test showed the moderate initial charge capacity (154.1 mAh/g), good rate capability (96.6%) and moderate cyclability (88.9%, 5-30; 75.8%, 5-60). These values are slightly lower than those of the Example 4 values indicating good but slightly decreased electrochemical quality.

This comparative example together with Examples 4-7 showed that electrochemically good quality LiCoO$_2$ particles without octahedral shape particles can be prepared with the low Li/Co metal ratio, but the density of the particles is remaining at very low level. LiCoO$_2$ particles comprising essentially octahedral shape particles as well as LiCoO$_2$ particles whose preparation method includes Co(OH)$_2$ particles comprising essentially octahedral shape particles offer the option of having both properties, high density and electrochemically good quality, in the particles.

Comparative Example 4

Preparation of Comparative LiCoO$_2$ Particles without Octahedral Shape Particles from Comparative Example 2 Co$_3$O$_4$ Particles Co$_3$O$_4$ particles, prepared by the method presented in the Comparative example 2, were intimately mixed with Li$_2$CO$_3$ particles with the Li/Co molar-ratio of 1.00. The obtained mixture was further calcinated at 1000° C. for 5 h in air. This comparative example shows LiCoO$_2$ particles prepared using the same Li/Co ratio and same temperature as in the Example 4, but from Co$_3$O$_4$ particles without octahedral shape particles.

Figure 16:
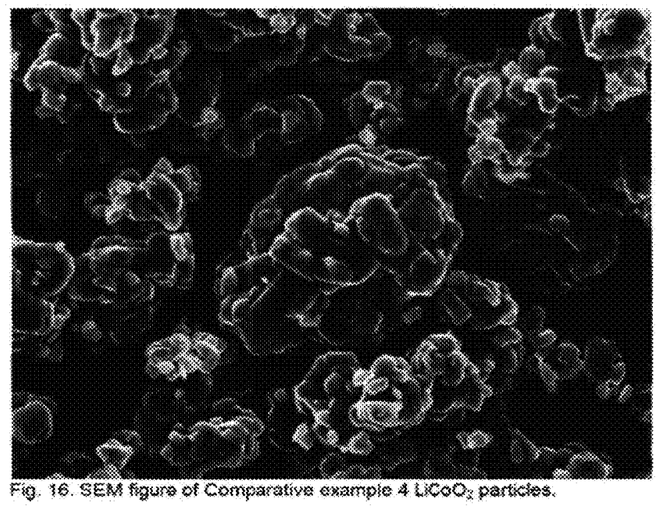
FIG. 16 provides an SEM figure of Comparative example 4 LiCOO$_2$ particles.

LiCoO$_2$ particles with the layered crystal structure (R$\bar{3}$m space group) were formed by the lithiation process. No traces of Co$_3$O$_4$ were observed. Co-% and Li-% were 59.8% and 7.0%, respectively, that further proves the formation of the LiCoO$_2$ particles. The morphology and physical properties of the particles were modified by the lithiation process. This can be observed from the following data. The SEM figure shows that the LiCoO$_2$ particles were comprising irregular shape particles without essentially octahedral shape particles (FIG. 16). The D50, D10 and D90 values were 12.1 µm, 4.8 µm and 21.3 µm, respectively. Tde was 2.61 g/cm$^3$ and SA 0.32 m$^2$/g. The above results show the increased particle size and densification of the particles when compared to those of the Comparative example 2 Co$_3$O$_4$ values, but particles are clearly less dense when compared to those of the Examples 4-7 LiCoO$_2$ values (Table 1). The latter is clear indication of the benefit of LiCoO$_2$ particles comprising essentially octahedral shape particles as well as LiCoO$_2$ particles whose preparation method includes Co(OH)$_2$ particles comprising essentially octahedral shape particles.

pH and free Li$_2$CO$_3$ were 9.56 and 0.013%, respectively. The values are lower when compared to those of the Example 4-7 values indicating a low risk of pressure buildup in the cell. The coin-cell test showed the moderate initial charge capacity (154.1 mAh/g), good rate capability (97.5%) and moderate cyclability (88.7%, 5-30). These values are slightly lower than those of the Example 4 values indicating good but slightly decreased electrochemical quality.

This comparative example together with Examples 4-7 showed that electrochemically good quality LiCoO$_2$ particles without octahedral shape particles can be prepared with the low Li/Co metal ratio of 1.00, but the density of the particles is remaining at very low level. LiCoO$_2$ particles comprising essentially octahedral shape particles as well as LiCoO$_2$ particles whose preparation method includes Co(OH)$_2$ particles comprising essentially octahedral shape particles offer the option of having both properties, high density and electrochemically good quality, in the particles.

Comparative Example 5

Preparation of Comparative LiCoO$_2$ Particles without Octahedral Shape Particles from Comparative Example 2 Co$_3$O$_4$ Particles Via Milling Step Co$_3$O$_4$ particles, prepared by the method presented in the Comparative example 2, were milled by a jet mill to obtain D50 of 1.4 µm. The milled Co$_3$O$_4$ particles were intimately mixed with Li$_2$CO$_3$ particles with the Li/Co molar-ratio of 1.05. The obtained mixture was further calcinated at 1000° C. for 5 h in air. This comparative example shows LiCoO$_2$ particles prepared by the method where LiCoO$_2$ particles are grown with the aid of excess amount of Li and small particle size Co$_3$O$_4$.

Figure 17:
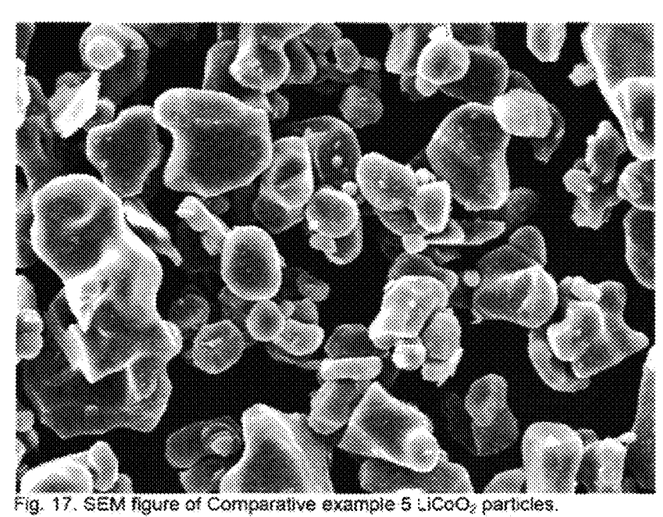
FIG. 17 provides an SEM figure of Comparative example 5 LiCOO$_2$ particles.

LiCoO$_2$ particles with the layered crystal structure (R$\bar{3}$m space group) were formed by the lithiation process. No traces of Co$_3$O$_4$ were observed. Co-% and Li-% were 58.2% and 7.0%, respectively, that further proves the formation of the LiCoO$_2$ particles. The morphology and physical properties of the particles were modified by the lithiation process. This can be observed from the following data. The SEM figure shows that the LiCoO$_2$ particles were comprising irregular shape particles without essentially octahedral shape particles (FIG. 17). The D50, D10 and D90 values were 9.9 µm, 5.2 µm and 18.5 µm, respectively. Tde was 2.86 g/cm$^3$ and SA 0.33 m$^2$/g. The above results show that particles are smaller, but only slightly less dense when compared to those of the Examples 4-7 LiCoO$_2$ values (Table 1).

pH and free Li$_2$CO$_3$ were 9.96 and 0.063%, respectively. The values are higher when compared to those of the Example 4-7 values, indicating an increased risk of pressure buildup in the cell. The coin-cell test showed the moderate initial charge capacity (153.6 mAh/g), moderate rate capability (90.8%) and moderate cyclability (88.3%, 5-30; 57.4%, 5-60). These values are lower than those of the Example 4 values indicating moderate electrochemical quality.

This comparative example together with Examples 4-7 showed that high density LiCoO$_2$ particles without octahedral shape particles can be prepared with the high Li/Co metal ratio, but the electrochemically quality of the particles is deteriorated and risk of pressure buildup in the cell is increased. LiCoO$_2$ particles comprising essentially octahedral shape particles as well as LiCoO$_2$ particles whose preparation method includes Co(OH)$_2$ particles comprising essentially octahedral shape particles offer the option of having all properties, high density and electrochemically good quality in the particles as well as low risk of pressure buildup in the cell.

Comparative Example 6

Preparation of Doped LiCoO$_2$ Particles without Essentially Octahedral Shape Particles Doped LiCoO$_2$ particles were prepared by the method presented in the Comparative example 4, but 0.2 mol-% of dopants (Mg, Al, Ti, Zr, B, Al+Ti) were intimately mixed with Co$_3$O$_4$ particles prior the mixing with Li$_2$CO$_3$. The dopants were added as oxides. This example shows that physical properties of the LiCoO$_2$ particles without essentially octahedral shape particles are deteriorated when the dopants are added.

Figure 18:
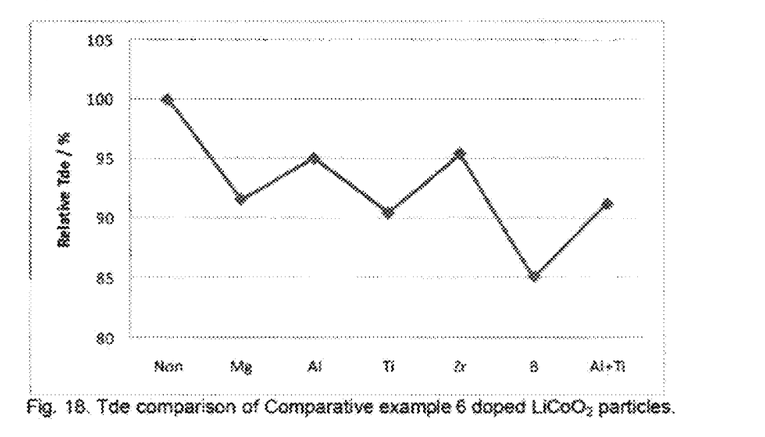
FIG. 18 provides a Tde comparison of Comparative example 6 doped LiCOO$_2$ particles.

Doped LiCoO$_2$ particles with the layered crystal structure (R$\bar{3}$m space group) were formed by the lithiation process. No traces of Co$_3$O$_4$ were observed. Density of the doped LiCoO$_2$ particles was clearly lower than that of the Comparative example 4 non-doped LiCoO$_2$ particles. Tde of the doped particles was decreased by more than 5% compared to that of the non-doped particles (FIG. 18) that is much more dramatic drop than in FIG. 11 where LiCoO$_2$ particles are comprising essentially octahedral shape particles. This comparative example together with Example 8 indicate that one or more dopants can be added more easily to LiCoO$_2$ particles comprising essentially octahedral shape particles compared to those of LiCoO$_2$ particles without essentially octahedral shape particles. This is one more benefit for LiCoO$_2$ particles comprising essentially octahedral shape particles.

TABLE 1

Summary of data presented in examples.

| Material | D10/µm | D50/µm | D90/µm | Tde/g/cm$^3$ | SA/m$^2$/g | Co-% | Li-% | pH | Free Li$_2$CO$_3$-% | Initial discharge capacity mAh/g | Rate capability % | Cyclability (5-30, 5-60) % |
|---|---|---|---|---|---|---|---|---|---|---|---|---|
| Ex. 1 | 5.7 | 15.7 | 31.7 | 2.29 | 1.5 | 62.9 | | | | | | |
| Ex. 2 | 5.4 | 15.5 | 31.1 | 2.26 | 1.6 | 74.2 | | | | | | |
| Ex. 3 | 6.4 | 14.4 | 26.0 | 2.56 | 0.55 | 73.3 | | | | | | |
| Co. ex. 1 | 1.1 | 11.0 | 20.5 | 1.53 | 2.4 | 62.7 | | | | | | |
| Co. ex. 2 | 2.3 | 11.9 | 20.7 | 1.64 | 2.2 | 73.2 | | | | | | |
| Ex. 4 | 5.9 | 13.8 | 25.9 | 2.88 | 0.41 | 59.7 | 7.0 | 9.66 | 0.017 | 155.0 | 96.5 | 90.1, 74.6 |
| Ex. 5 | 8.4 | 14.7 | 26.6 | 2.78 | 0.16 | 59.3 | 7.3 | 9.63 | 0.024 | 157.8 | 89.5 | |
| Ex. 6 | 7.5 | 18.5 | 38.1 | 3.01 | 0.21 | 59.7 | 7.0 | 9.83 | 0.046 | 156.8 | 88.2 | |
| Ex. 7 | 7.7 | 17.7 | 32.7 | 2.94 | 0.27 | 60.0 | 6.9 | 9.90 | 0.061 | 154.9 | 87.4 | |
| Co. ex. 3 | 3.6 | 12.3 | 21.5 | 2.53 | 0.57 | 59.7 | 7.1 | 9.77 | 0.028 | 154.1 | 96.6 | 88.9, 75.8 |
| Co. ex. 4 | 4.8 | 12.1 | 21.3 | 2.61 | 0.32 | 59.8 | 7.0 | 9.56 | 0.013 | 154.1 | 97.5 | 88.7, — |
| Co. ex. 5 | 5.2 | 9.9 | 18.5 | 2.86 | 0.33 | 58.2 | 7.0 | 9.96 | 0.063 | 153.6 | 90.8 | 88.3, 57.4 |

Based on table 1, which illustrates the properties of LiCoO$_2$ material prepared using prior art processes (Comparison examples 1-6), and LiCoO$_2$ prepared according to the method of the present invention (examples 1-7), the following can be surmised:

It is important that LiCoO$_2$ material of the invention have at least two properties selected from the following three properties (i)-(iii):

(i) free Li$_2$CO$_3$% of the LiCoO$_2$ material is <0.05,
(ii) the initial discharge capacity (mAh/g) of the LiCoO$_2$ material is >154.5 and (iii) Tde (high density, g/cm³) of the LiCoO₂ material is >2.7.

DISCLAIMER

Based upon the foregoing disclosure, it should now be apparent that the Co(OH)₂ particles, the Co₃O₄ particles and the LiCoO₂ particles and the preparation such particles as described herein will carry out the embodiments set forth hereinabove. It is, therefore, to be understood that any variations evident fall within the scope of the claimed invention and thus, the selection of specific component elements can be determined without departing from the spirit of the invention herein disclosed and described.

The invention claimed is:

1. A method comprising:
   (a) reacting a reaction mixture comprising:
      (i) a cobalt solution containing chloride;
      (ii) a solution of ammonia hydroxide; and
      (iii) a solution of an alkaline hydroxide;
      wherein pH of the reaction mixture is maintained within the range of 10.0-12.5 and temperature of the reaction mixture is maintained within the range of 30-50° C.;
   (b) isolating cobalt particles comprising Co(OH)₂ particles from the reaction mixture comprising β-Co(OH)₂ particles with an octahedral shape and a P$\bar{3}$m1 space group in X-ray powder diffraction, wherein the isolated β-Co(OH)₂ particles have a tap density (Tde) of in the range of 1.7-2.8 g/cm³;
   (c) preparing a mixture comprising:
      (i) the isolated cobalt particles of step (b); and
      (ii) lithium salt comprising Li₂CO₃, LiOH, or a mixture thereof, wherein the prepared mixture of cobalt particles and lithium salt has a Li/Co molar-ratio of 0.95-1.05; and
   (d) heating the mixture of cobalt particles and lithium salt at 800-1100° C. for 1-10 hours in air to prepare cobalt particles comprising LiCoO₂ particles, wherein the LiCoO₂ particles have the following properties:
      (i) free Li₂CO₃-% of the LiCoO₂ particles is <0.05,
      (ii) the initial discharge capacity (mAh/g) of the LiCoO₂ particles is >154.5,
      (iii) Tde (tap density, g/cm3) of the LiCoO2 particles is 2.7-3.1,
      (iv) a pH of a suspension of the LiCoO2 particles is below 10.1, and
      (v) the LiCoO₂ particles consist essentially of LiCoO₂ particles having an octahedral shape.

2. The method of claim 1, wherein the pH of the suspension of the LiCoO₂ particles is below 9.7.

3. The method of claim 1, wherein the octahedral shape is a polyhedron with eight triangular-shaped faces and six vertexes.

4. The method of claim 1, wherein the reaction mixture is reacted by adding the cobalt solution to the solution of ammonia hydroxide and the solution of the alkaline hydroxide.

5. The method of claim 1, wherein the concentration of ammonia hydroxide in the solution of ammonia hydroxide is equivalent to the concentration of the alkaline hydroxide in the solution of the alkaline hydroxide and wherein the pH of the reaction mixture is maintained within the range of 10.0-12.5 by controlling feed rates of the solution of ammonia hydroxide and the solution of the alkaline hydroxide within a ratio range of 1-7.

6. The method of claim 1, wherein the average particle size D50 of the isolated β-Co(OH)₂ particles is in the range of 3-40 μm.

7. The method of claim 1, wherein the surface area (SA) of the isolated β-Co(OH)₂ particles is in the range of 0.4-5 m²/g.

8. The method of claim 1, wherein the reaction mixture comprises 70-170 g/L cobalt.

9. The method of claim 1, wherein the alkaline hydroxide comprises sodium hydroxide.

10. The method of claim 1, wherein the reaction mixture further comprises a dopant selected from Mg, Ca, Sr, Ti, Zr, B, Al, F, and a mixture thereof.

11. The method of claim 10, wherein the mixture comprises the dopant at a concentration in the range of 0.05-5 mol% of Co.

12. The method of claim 1, wherein prior to heating the isolated β-Co(OH)₂ particles, the isolated β-Co(OH)₂ particles are mixed with a dopant selected from Mg, Ca, Sr, Ti, Zr, B, Al, F, and a mixture thereof.

13. The method of claim 12, wherein the mixture comprises the dopant at a concentration in the range of 0.05-5 mol% of Co.

14. A method comprising:
   (a) reacting a reaction mixture comprising:
      (i) a cobalt solution containing chloride;
      (ii) a solution of ammonia hydroxide; and
      (iii) a solution of an alkaline hydroxide; and
      wherein pH of the reaction mixture is maintained within the range of 10.0-12.5 and temperature of the reaction mixture is maintained within the range of 30-50° C.;
   (b) isolating cobalt particles comprising Co(OH)₂ particles from the reaction mixture consisting essentially of β-Co(OH)2 particles with an octahedral shape and a P$\bar{3}$m1 space group in X-ray powder diffraction, wherein the isolated β-Co(OH)₂ particles have a tap density (Tde) of in the range of 1.7-2.8 g/cm³;
   (c) heating the isolated cobalt particles at 500-1200° C. for 0.5-10 hours in air to prepare cobalt particles comprising Co₃O₄ particles; and
   (d) preparing a mixture comprising:
      (i) the cobalt particles comprising Co(OH)₂ particles of step (b), the cobalt particles comprising Co₃O₄ particles of step (c), or a mixture thereof; and
      (ii) lithium salt comprising Li₂CO₃, LiOH, or a mixture thereof, wherein the prepared mixture of cobalt particles and lithium salt has a Li/Co molar-ratio of 0.95-1.05; and
   (e) heating the mixture of cobalt particles and lithium salt at 800-1100° C. for 1-10 hours in air to prepare cobalt particles comprising LiCoO₂ particles, wherein the LiCoO₂ particles have the following properties:
      (i) free Li₂CO₃-% of the LiCoO₂ particles is <0.05,
      (ii) the initial discharge capacity (mAh/g) of the LiCoO2 particles is >154.5,
      (iii) Tde (tap density, g/cm³) of the LiCoO₂ particles is 2.7-3.1,
      (iv) a pH of a suspension of the LiCoO₂ particles is below 10.1, and
      (v) the LiCoO₂ particles consist essentially of LiCoO₂ particles having an octahedral shape.

15. The method of claim 14, wherein the pH of the suspension of the LiCoO₂ particles is below 9.7.

16. The method of claim 14, wherein the octahedral shape is a polyhedron with eight triangular-shaped faces and six vertexes.

17. The method of claim 14, wherein the reaction mixture is reacted by adding the cobalt solution to the solution of ammonia hydroxide and the solution of the alkaline hydroxide.

18. The method of claim 14, wherein the concentration of ammonia hydroxide in the solution of ammonia hydroxide is equivalent to the concentration of the alkaline hydroxide in the solution of the alkaline hydroxide and wherein the pH of the reaction mixture is maintained within the range of 10.0-12.5 by controlling feed rates of the solution of ammonia hydroxide and the solution of the alkaline hydroxide within a ratio range of 1-7.

19. The method of claim 14, wherein the average particle size D50 of the isolated $\beta\text{-Co(OH)}_2$ particles is in the range of 3-40 μm.

20. The method of claim 14, wherein the surface area (SA) of the isolated $\beta\text{-Co(OH)}_2$ particles is in the range of 0.4-5 $m^2/g$.

21. The method of claim 14, wherein the reaction mixture comprises 70-170 g/L cobalt.

22. The method of claim 14, wherein the alkaline hydroxide comprises sodium hydroxide.

23. The method of claim 14, wherein the reaction mixture further comprises a dopant selected from Mg, Ca, Sr, Ti, Zr, B, Al, F, and a mixture thereof.

24. The method of claim 23, wherein the mixture comprises the dopant at a concentration in the range of 0.05-5 mol% of Co.

25. The method of claim 14, wherein prior to heating the isolated $\beta\text{-Co(OH)}_2$ particles, the isolated $\beta\text{-Co(OH)}_2$ particles are mixed with a dopant selected from Mg, Ca, Sr, Ti, Zr, B, Al, F, and a mixture thereof.

26. The method of claim 25, wherein the mixture comprises the dopant at a concentration in the range of 0.05-5 mol% of Co.

* * * * *